US 9,442,703 B2

(12) United States Patent
Roll

(10) Patent No.: US 9,442,703 B2
(45) Date of Patent: Sep. 13, 2016

(54) DEFINING AN INTERACTIVE USER INTERFACE

(75) Inventor: Erik M. Roll, New York, NY (US)

(73) Assignee: Proscope Technologies, Inc., Horsham, PA (US)

( * ) Notice: Subject to any disclaimer, the term of this patent is extended or adjusted under 35 U.S.C. 154(b) by 1243 days.

(21) Appl. No.: 12/196,881

(22) Filed: Aug. 22, 2008

(65) Prior Publication Data
US 2009/0187828 A1 Jul. 23, 2009

Related U.S. Application Data

(60) Provisional application No. 60/957,354, filed on Aug. 22, 2007.

(51) Int. Cl.
*G06F 3/00* (2006.01)
*G06F 9/44* (2006.01)
*G06F 3/01* (2006.01)

(52) U.S. Cl.
CPC .......................... *G06F 8/38* (2013.01)

(58) Field of Classification Search
CPC ............... G06F 17/3089; G06F 17/30873; G06F 17/30905; G06F 9/4443; G06F 17/30899
USPC .................. 715/760, 762, 863, 810, 821
See application file for complete search history.

(56) References Cited

U.S. PATENT DOCUMENTS

| | | | |
|---|---|---|---|
| 5,708,845 A * | 1/1998 | Wistendahl et al. | 715/202 |
| 5,742,768 A * | 4/1998 | Gennaro et al. | 709/203 |
| 5,801,687 A * | 9/1998 | Peterson et al. | 715/201 |
| 6,081,263 A * | 6/2000 | LeGall et al. | 715/760 |
| 6,230,174 B1 * | 5/2001 | Berger et al. | 715/201 |
| 6,476,834 B1 * | 11/2002 | Doval et al. | 715/863 |
| 7,139,970 B2 * | 11/2006 | Michaud et al. | 715/247 |
| 2004/0243931 A1 | 12/2004 | Stevens et al. | |
| 2005/0160368 A1 * | 7/2005 | Liu et al. | 715/762 |
| 2007/0245264 A1 * | 10/2007 | Hoerentrup et al. | 715/835 |

* cited by examiner

*Primary Examiner* — Nicholas Augustine

(57) ABSTRACT

A system and method for defining an interactive user interface having one or more states and one or more interactive elements. An exemplary implementation of the method comprises the steps of inputting one full screen graphics of an interactive user interface for each state of the interactive user interface; defining an area within the interactive user interface for each of the one or more interactive elements, and automatically generating computer readable code or graphics enabling a graphic display of each state of each interactive element. The method may further comprise the step of storing the geometric properties and positional information of the defined area of the interactive user interface corresponding to each of the one or more interactive elements. The stored geometric properties and positional information can be used to facilitate the editing and modification of the interactive user interface.

20 Claims, 8 Drawing Sheets

DEFINING AN INTERACTIVE USER INTERFACE

RELATED INVENTION

This application claims benefit of U.S. Provisional Application Ser. No. 60/957,354, filed Aug. 22, 2007, entitled "Defining an Interactive User Interface;" which application is incorporated herein by reference.

FIELD OF THE INVENTION

This invention relates generally to a method and system to define interactive computer user interfaces.

BACKGROUND OF THE INVENTION

Interactive applications generally have a user interface composed of interactive elements (e.g. buttons). The interactive elements usually have multiple states that respond to user action. A user may use a pointing device, usually a computer mouse, to place a pointer at different locations within the interface. Responding to the user's action, such as placing the mouse pointer over an interactive element (rollover), a different graphic of the interactive element under the mouse pointer may be displayed to indicate the different state of the interactive element.

Customarily, interactive elements within an interactive interface can be as simple as having only one state (normal), or two states (normal and rollover), or could be as complex as having four (normal, rollover, pressed, and disabled) or even more states. The author of the interactive interface can associate a variety of predetermined functions to any defined element.

Today, interactive applications are generally constructed by a method known as "cutting and placing." First, graphics creation and editing software, such as Microsoft® Paint or Adobe Photoshop®, is used to author the overall appearance and layout of the interface. Graphics for each state of each individual interactive element are created, usually by defining and cutting the element from an overall layout, and then saving as an individual file. For a two state element, such as a button, it is typically displayed in a normal state, but then displayed in a rollover state in response to mouse location. The author manually creates and saves at least one image for the rollover state of the button and a background image containing the normal image of the button at the correct geometric position. This method requires the cutting and placing of a large number of graphic files when the interactive interface is complex, such as when multiple interactive elements are desired. In certain instances, for an interface containing multiple elements having multiple states, the number of images "I" requiring creation would be at least $I=(E \times (S-1))+1$, where "E" is the number of interactive elements in the interface and "S" is the number of states (assuming all elements have the same number of states). Other instances require that a graphic be created for each state of each of the individual interactive elements. In these other instances, the number of graphics an author must create and manage increases to $I=(E \times S)+1$.

The second step of the construction process requires placement of the created images at their proper geometric position within the interface. To create the final interface, the author would usually need a second software application, such as Adobe® Flash® or Microsoft® Visual Studio®. Using these tools, the author places an individual image for each state of each interactive element against a background graphic, trying to place the respective state image of the interactive element back in the exact, original location of the element within the overall layout. When individual graphic files are created and saved for each element at the cutting stage, the files only retain their size information, but not their positional information in relation to the overall interface from which the element was cut. Because of the lack of inherent positional information in the files, the author must manually line up each of the completed, individual pieces of graphic to achieve the intended look, usually through multiple rounds of painstaking trial and error.

Lastly, the graphic for each state of each interactive element must be assembled, and functionality defined, so that a pre-determined function is assigned to each state of each element in response to user input. Depending on the output platform, the defining can occur during reassembly of the element layers in the overall interface, or as a separate step. The entire process is time-consuming and prone to error, making the "cutting and placing," and the defining and reassembly inefficient and labor intensive. If the author later decides to change an image for one or more states of one or more elements, or decides to add a state, the entire process of "cutting and placing," and defining and reassembly of the respective elements must be completely performed again.

SUMMARY OF THE INVENTION

The present invention provides a system for defining an interactive user interface, and includes a graphical user interface for inputting at least one full screen graphics of an interactive user interface having one or more states. Each of the at least one full screen graphics can be associated with one state of the interactive user interface. An interactive graphical tool can be included for defining an area within the interactive user interface that corresponds to any/each of one or more interactive elements displayed within any/each of the at least one full screen graphics. A data storage device can be included for storing geometric properties and positional information of the defined area of the interactive user interface corresponding to each of the one or more interactive elements. An output generator can also be included for automatically generating computer readable code or graphics enabling a display of each state of each of the one or more defined interactive elements.

In one aspect of the invention, the code or the graphics for each state of each of the one or more defined interactive elements is generated from the respective full screen graphics inputted for the respective state and from the geometric properties and positional information defined and stored for the respective interactive element. In another aspect, the graphics for each state of each of the one or more defined interactive elements corresponds to a portion of the full screen graphics inputted for the respective state delimited by the geometric properties and positional information defined and stored for the respective interactive element.

In a further aspect, the computer readable code generated by the output generator enables a computer to display each state of each of the one or more interactive elements in the area defined within the interactive user interface for the respective interactive element in response to user input for the respective state and for the respective interactive element. In certain embodiments of the system, the interactive user interface is displayed in a web browser.

The system of the present invention may also comprise a second graphical tool for defining association of each of the at least one full screen graphics to one state of the interactive user interface. A third graphical tool could also be included for assigning functionality to each state of each of the interactive elements.

The present invention also provides a method implemented at least in part by machine for defining an interactive user interface. The method can include the steps of inputting one full screen graphics of an interactive user interface for each state of the interactive user interface, where the interactive user interface has one or more states and one or more interactive elements; defining an area within the interactive user interface for each of the one or more interactive elements; and automatically generating computer readable code or graphics enabling a graphic display of each state of each interactive element.

In one embodiment of the method, a further step would store the geometric properties and positional information of the defined area of the interactive user interface corresponding to each of the one or more interactive elements. In another embodiment, the code or the graphics for each state of each of the one or more defined interactive elements is generated from the respective full screen graphics inputted for the respective state and from the geometric properties and positional information defined and stored for the respective interactive element. In a further embodiment, the graphics for each state of each of the one or more defined interactive elements corresponds to a portion of the full screen graphics inputted for the respective state delimited by the geometric properties and positional information defined and stored for the respective interactive element.

In one aspect of the invention, the computer readable code generated enables a computer to display each state of each of the one or more interactive elements in the area defined within the interactive user interface for the respective interactive element in response to user input for the respective state and for the respective interactive element. In another aspect, the interactive user interface is displayed in a web browser.

In one embodiment of the invention, further editing the interactive user interface includes defining an area within the interactive user interface for each interactive element to be added or revised, and automatically generating computer readable code enabling a graphic display of each state of each interactive element including the added and revised interactive elements. In another embodiment, further editing of the interactive user interface includes inputting one full screen graphics of the interactive user interface for each state of the interactive user interface to be added or revised; retrieving, from the stored geometric properties, positional information corresponding to each of the one or more interactive elements; and automatically generating computer readable code enabling a graphic display of each state of each interactive element based on the added or revised full screen graphics.

The present invention further provides a second method implemented at least in part by machine for defining an interactive user interface. In this method involves inputting one full screen graphics of an interactive user interface for each state of the interactive user interface, where the interactive user interface has one or more states and one or more interactive elements; defining an area within the interactive user interface for each of the one or more interactive elements; and automatically generating an individual graphic for each state of each interactive element.

In one aspect of the second method of the invention, the individual graphic for each state of each interactive element is generated from the full screen graphics for the respective state and from the area defined for the respective interactive element. In another aspect, the individual graphic for each state of each interactive element is a portion of the full screen graphics for the respective state delimited by the area defined for the respective interactive element.

One embodiment of this second method further involves storing the geometric properties and positional information of the defined area of the interactive user interface corresponding to each of the one or more interactive elements. In another embodiment, the method further includes creating a computer readable code of the interactive user interface causing a computer to display each individual graphic in the area defined within the interactive user interface for the respective interactive element and in response to user input for the respective state.

BRIEF DESCRIPTION OF THE DRAWINGS

The present invention will be better understood with reference to the following description taken in combination with the drawings.

DETAILED DESCRIPTION OF ILLUSTRATIVE EMBODIMENTS

Example Computing Environment

Figure 1:
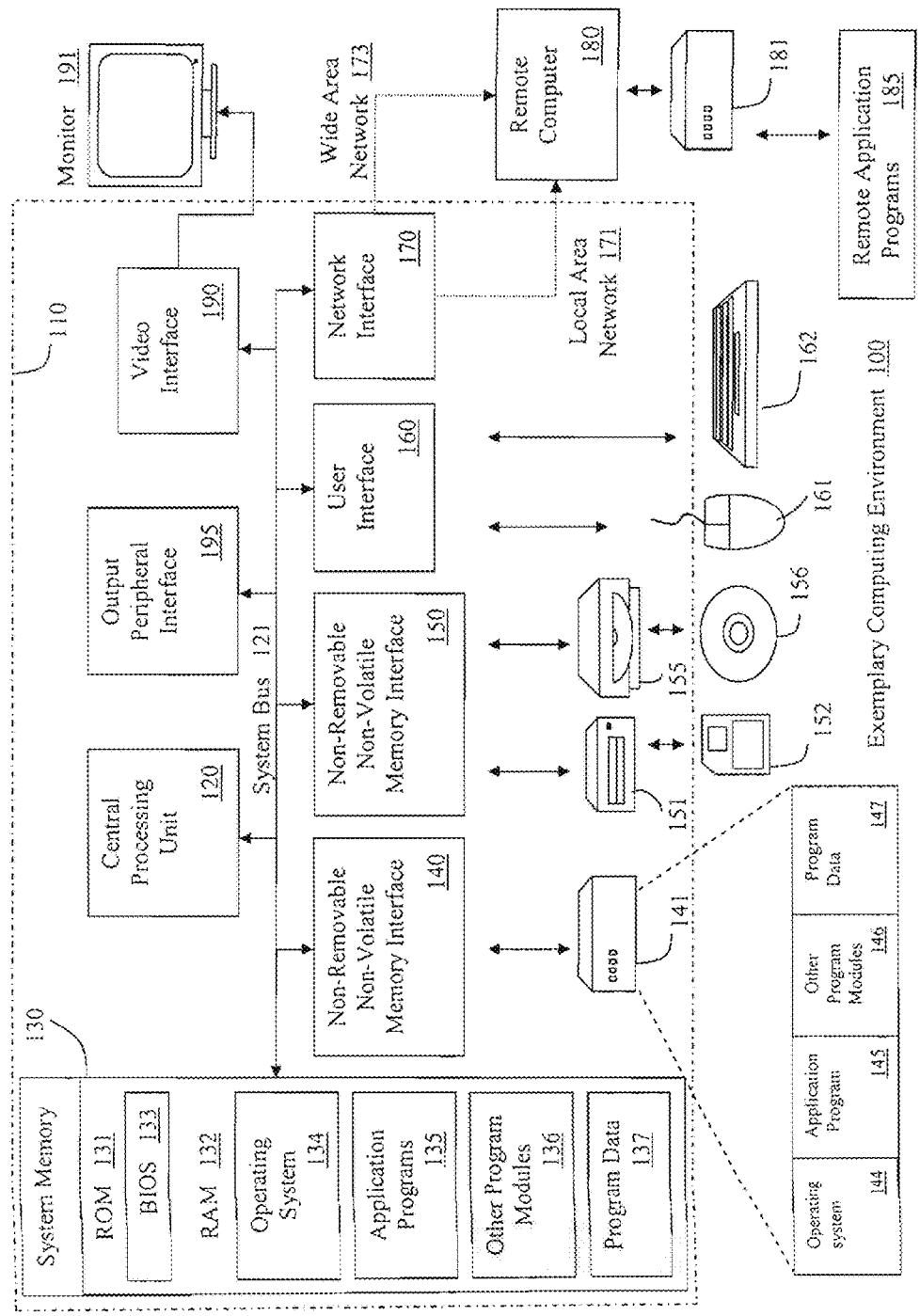
FIG. 1 illustrates a exemplary computing environment in which the present invention can be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI-Express bus.

Computer 110 typically includes a variety of computer readable media. Computer readable media can be any available media that can be accessed by computer 110 and includes volatile and nonvolatile, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers and printer (not shown), which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes means for establishing communications over the WAN 173, such as the Internet. In a networked environment, program modules depicted relative to the computer 110, or portions thereof, may be stored in the remote memory storage device. By way of example, and not limitation, FIG. 1 illustrates remote application programs 185 as residing on memory device 181. Remote application programs 185 include, but not limited to web server applications such as Microsoft® Internet Information Services® (IIS) and Apache HTTP Server which provides content resides on the remote storage device 181 or other accessible storage device to the World Wide Web. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

The Present Invention

The present Interface Definition software of the present invention (Carving Station) introduces a novel approach to the creation of interactive applications by uniquely organizing information and automating much of the process of defining an interactive user interface. The automation process of the present invention can be customized for any platform. In a preferred embodiment, Carving Station provides a Design mode for composition of the interactive interface, and a Preview mode for visualization and validation of the created interactive interface.

Figure 2:
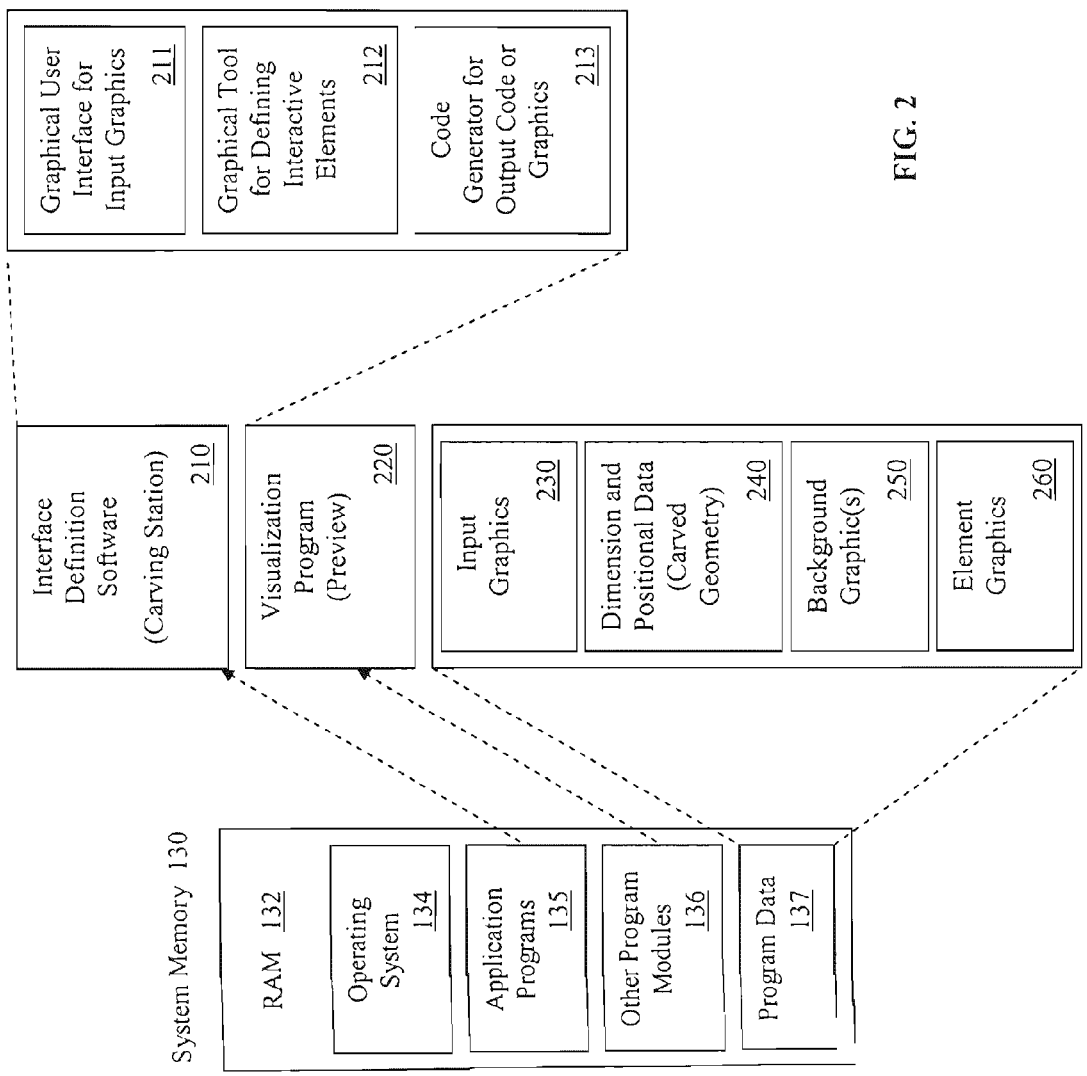
FIG. 2 illustrates an example of components of the present invention in system memory according to one embodiment of the invention.

FIG. 2 illustrates components of Carving Station in system memory 130 of one embodiment of the invention. In this embodiment, Carving Station 210 resides in the system memory 130 as one of the application programs 135. A graphical user interface component 211 is provided for inputting graphics, and a graphical tool 212 for the definition of interactive elements. Finally, a code generator 213 is provided for the generation of output codes and graphics. Other program modules 136, such as a visualization program 220, are provided for the visualization and validation of the composition, if needed. Program data 137 includes, but is not limited to, input graphics 230, dimensional and positional data of the defined interactive elements (Carved Geometry) 240, background graphic(s) 250, and output element graphics 260, if required by the selected output platform.

Figure 3:
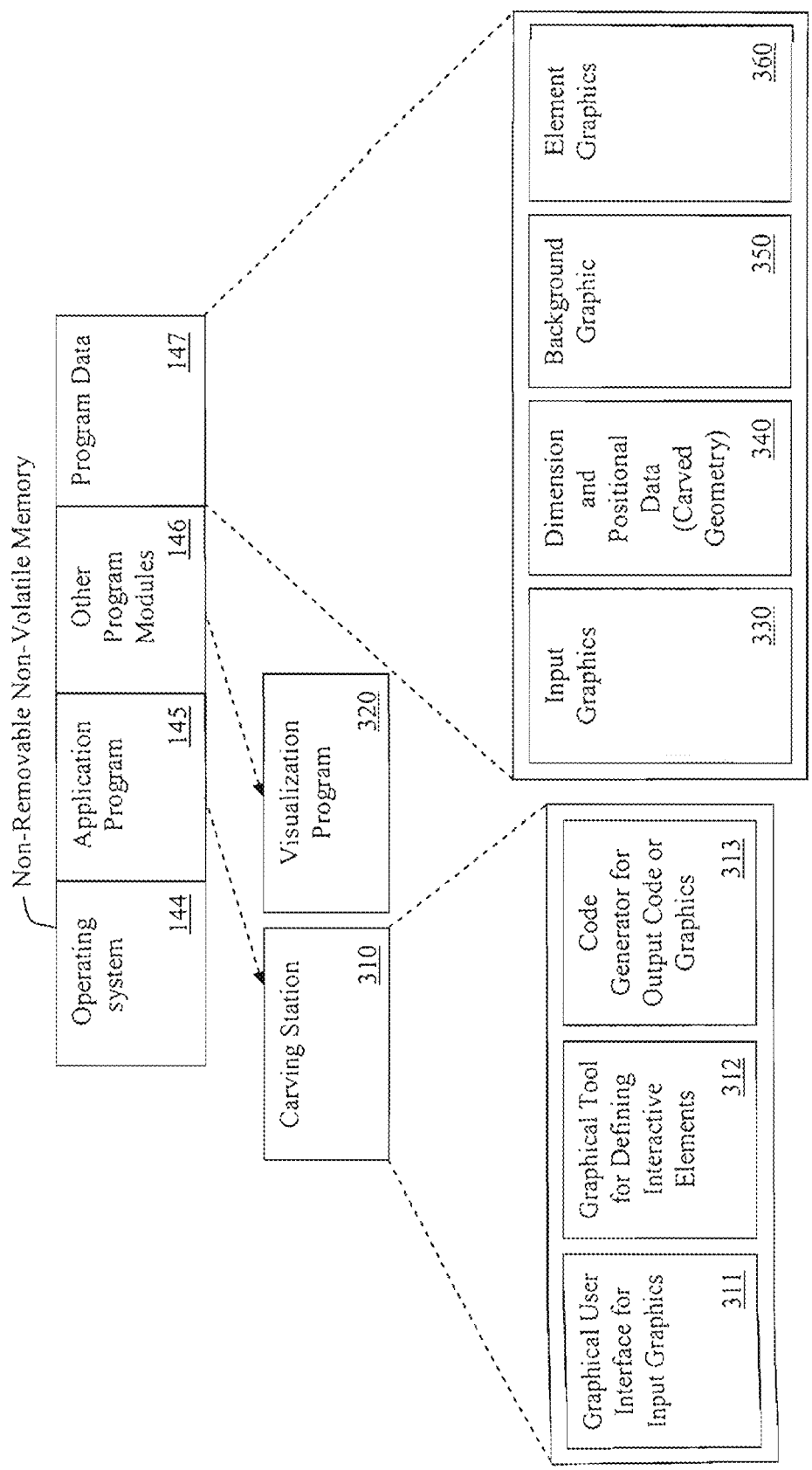
FIG. 3 illustrates an example of components of the present invention stored on a non-volatile computer readable media according to one embodiment of the invention.

FIG. 3 exemplifies one embodiment of the components of Carving Station, stored on a non-volatile computer readable media device 141, such as a hard drive. The Carving Station program 310, and its components (graphical user interface for input graphics 311, graphical tool for defining interactive elements 312, and code generator for output code or graphics 313) are stored as an application program 145 on the computer readable media 141 and can be read into system memory 130 at run time. The computer readable media may also contain other program modules 146, such as a copy of the visualization program 320 for the visualization and validation of the composition. Program data 147, which includes, but is not limited to, input graphics 330, dimensional and positional data for the defined elements (Carved Geometry) 340, background graphic 350, and graphics for the interactive elements 360 if required by the output platform.

Figure 4:
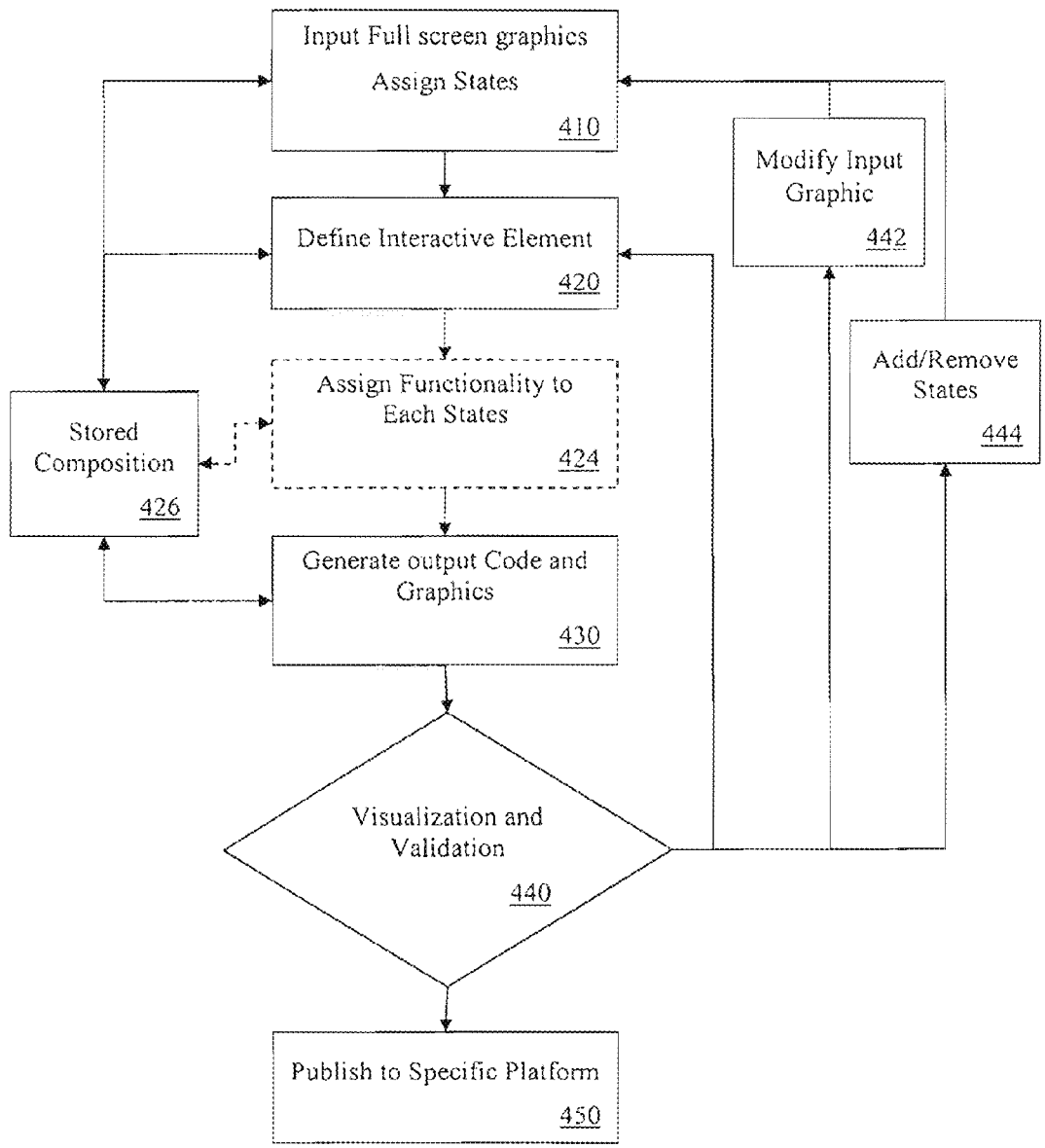
FIG. 4 is a flow diagram illustrating aspects of method steps of the present invention.

FIG. 4 illustrates a flow diagram of aspects of method steps of the present invention. In a platform generic embodiment of the invention, a computerized method for defining an interactive user interface includes inputting one full screen graphics of an interactive user interface for each state of the interactive user interface 410, defining an area within the interactive user interface for each of the one or more interactive elements 420, and automatically generating platform specific computer readable code enabling a graphic display of each state of each interactive element 430. Further, editing an interactive user interface already defined involves inputting one full screen graphics of the interactive user interface for each state of the defined interactive user interface to be revised 442 or added 444, defining an area within the interactive user interface for each interactive element to be added or revised 420; and automatically generating computer readable code enabling a graphic display of each state of each interactive element 430.

More specifically, the author first decides on a layout of the interactive user interface, including the number of states for the interactive elements. Instead of inputting an individual graphic for each state of each element, as customarily done, the author inputs one full screen graphics for each state 410, where the one full screen graphics contains all of the interactive elements displayed in the respective state. For example, for a rollover state, the author inputs only one full screen graphics, where the one full screen graphics shows each interactive element in its rollover state. A full screen graphics, as used herein, can refer to a graphic that occupies the entire intended display area of the interactive interface, or to a graphic of a portion of the interactive interface within which the interactive elements would reside.

Figure 5A:
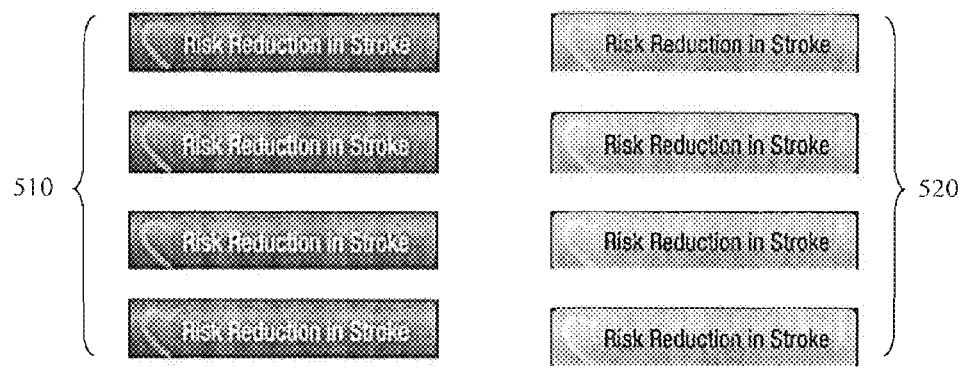
FIGS. 5A and 5B illustrate an example of "cutting and placing" methods.
Figure 5B:
Figure 6A:
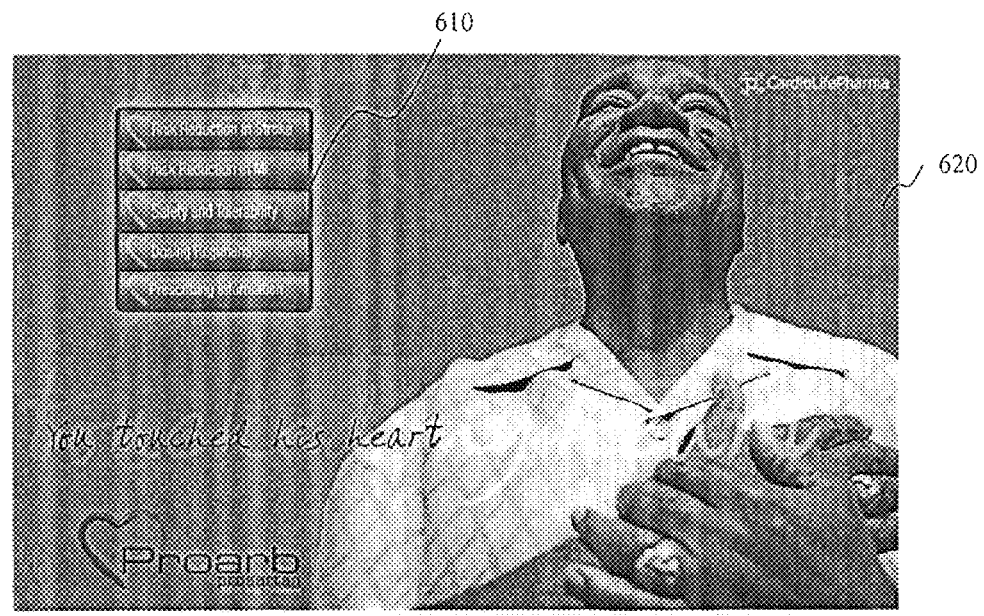
FIGS. 6A and 6B show two exemplary full screen graphics used as input to generate the same interactive elements as shown in FIGS. 5A and 5B according to an aspect of the present invention.
Figure 6B:
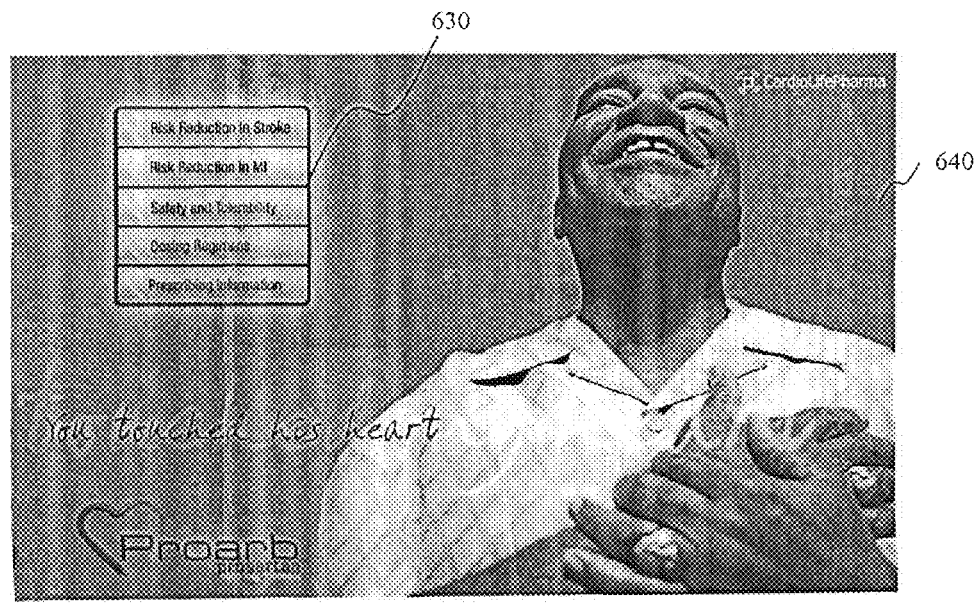

Accordingly, the number of images the author must create is equal to the number of states, I=E. Therefore, the present invention greatly reduces the number of individual data points, such as graphics and positional information, the author must supply and manage. FIGS. 5A and 5B illustrate an example of the prior art "cutting and placing" method. For an interface having five two-state buttons, a total of 11 individual graphics must be created (one graphic for each of five buttons for the normal state 510 (FIG. 5A), one graphic for each of five buttons for the rollover state 520 (FIG. 1A), and one background graphic 530 (FIG. 5B). FIGS. 6A and 6B illustrate two images input by the author in the present invention to generate the same five button two-state interface shown in FIGS. 5A and 5B. Using Carving Station, the author inputs only one full screen graphics for the normal state 620, which shows all elements in their normal state 610 (FIG. 6A), and one full screen graphics for the rollover state 640, which shows all elements in their rollover state 630 (FIG. 6B).

Figure 7:
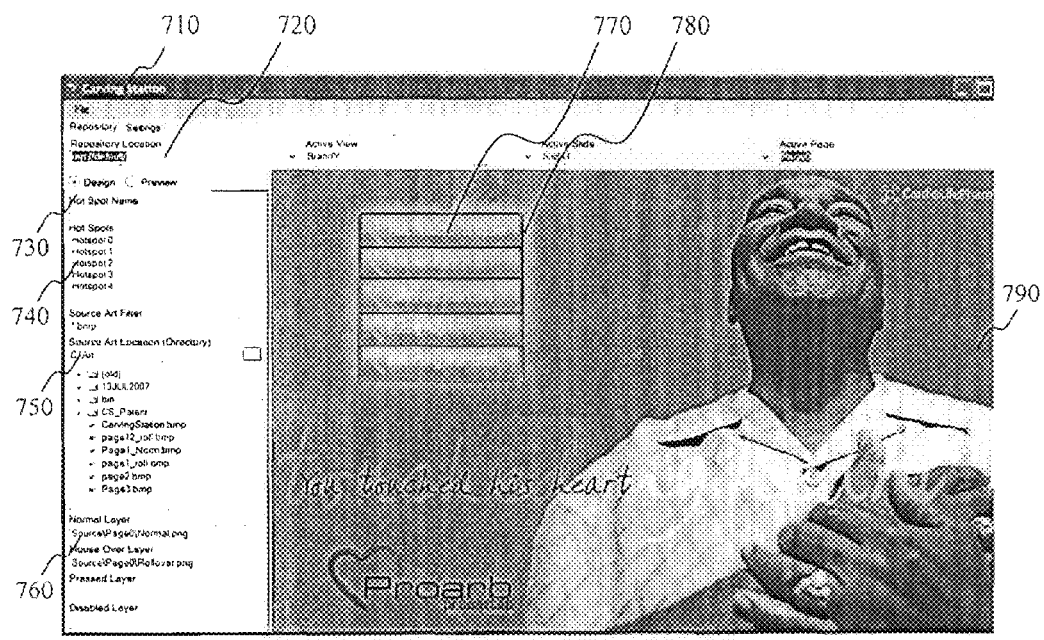
FIG. 7 shows an exemplary graphical interface of one embodiment of the invention in Design Mode.
Figure 8A:
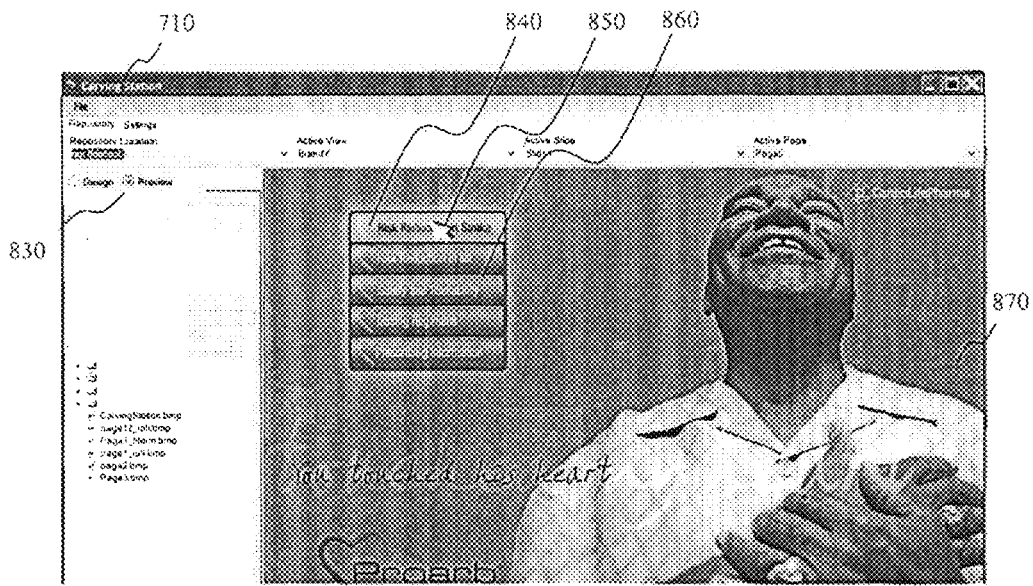
FIGS. 8A and 8B show exemplary graphical interfaces of one embodiment of the invention in Preview Mode.
Figure 8B:
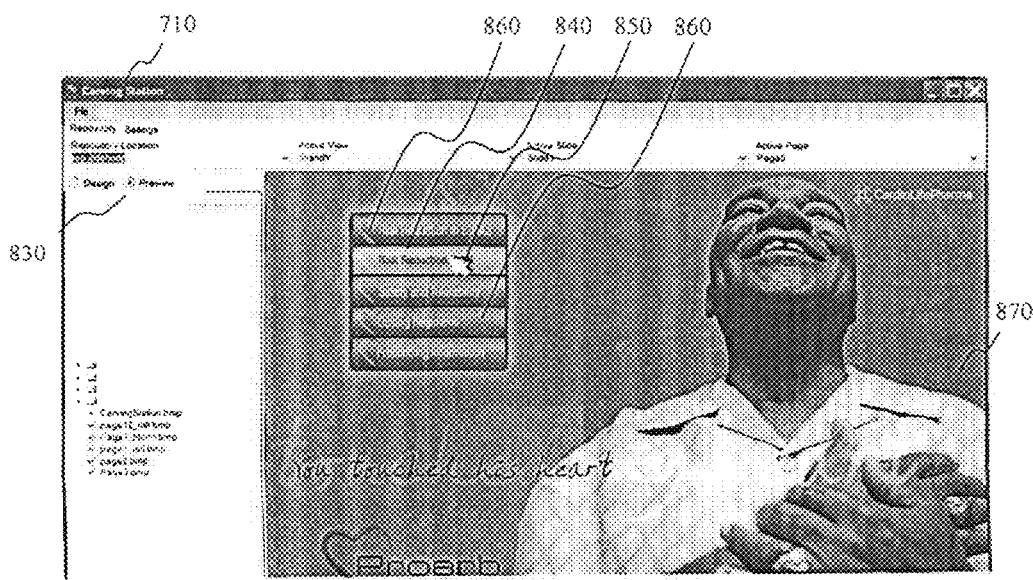

Referring now to FIG. 7, Carving Station provides a graphical user interface for the input graphics 311 in a Design mode 730. The author inputs each created full screen graphics into Carving Station, and assigns the graphic to its corresponding state 410. FIG. 7 illustrates a screen shot of the graphical user interface of a preferred embodiment 710 of the present invention in the design mode 730. In the FIG. 7 embodiment, Carving Station 710 is a stand-alone Windows application, although the present invention can be adapted for other applications, or as a component of a larger software package, such as Adobe Photoshop®, Flash®, or Microsoft® Visual Studio®. As shown, the interface provides the author an option to select between the Design mode 730 and a Preview Mode 830 (FIGS. 8A and 8B). The author can also designate a location for Source Art 750, where the full screen graphics (input graphics 330) can be located. A file name for each full screen graphics can be entered into the corresponding space for each respective layer 760 (each included state representing a layer). The full screen graphics are displayed as layers in a display area 790. In one embodiment of the invention, Carving Station 710 provides four state layers (Normal, Mouse Over (i.e., Rollover), Pressed, and Disabled). In the example illustrated in FIG. 7, only two states are used (Normal and Mouse Over), with the unused states left blank. The author can also designate a location for the collection of the output files 760, such as: store to Repository; File System; Oracle® Database; SQL Server database; and Microsoft® Content Manager Server. The output files 760 can be made compatible with various formats, such as: Adobe® Flash® Movie; PowerPoint® file; HTML Page; and Microsoft® Sharepoint® server; etc.

As a final author step in the design process of the present invention, the author uses tools provided by Carving Station 212 to graphically identify areas on the full screen graphics corresponding to the desired individual interactive elements 420. In the example of FIG. 7, the individual elements are defined as rectangles 780. The areas selected (Hot Spots) to define the interactive elements are highlighted in a different color 770. Each Hot Spot is assigned a name, and is displayed in a list 740. All of the interactive elements for all of the states (or layers) are defined at the same time. The size and positional information of each interactive element in relation to the full screen graphics (Carved geometry) 240, is inherent to the definition of the geometrical area that represents each interactive element, and is recorded and saved when defined by the author. Therefore, the customary need to retain positional information externally is eliminated, along with the requirement of placing (or replacing) the elements manually through trial and error.

At any time during the interactive interface defining process, the author can define and save an entire composition 426, including all of the graphics and all of the positional and size information of the interactive elements, to a computer readable media 147. Functionality for each state of each of the interactive element can be assigned during element definition, or as a separate step at a later time 424. If the author later desires to change the look of a state, all the author needs to do is input a full screen graphics incorporating the desired change 442, replacing the original graphic associated with the respective state 760. The present invention then detects that a source graphic has changed and automatically updates the composition. The author could then store the updated composition. If an author desires to add states to an already defined interface, the author merely inputs one full screen graphics for each state the author would like to add 444, and associates the respective full screen graphics with the proper state 760. If the author desires to add an interactive element, the author merely identifies an area on the full screen graphics for the interactive element to be added 420. A name is assigned to the newly added element 740, and the size and positional information of the added interactive element is automatically recorded and saved 426. Accordingly, there is no need to supply, manage and place numerous graphics, or to define and reassemble every element layer in the interactive user interface. Since the design process of the present invention is platform independent, the author needs focus only on aesthetics of the interface, with no concern to platform specific coding.

Preview mode 830 (FIGS. 8A and 8B) enables the author to visualize and validate the interactive interface designed 440. In a preferred embodiment, a specific platform is selected by the author at the beginning of the design process. When the Preview mode 830 is selected, the Carving Station, using the dimension and positional information (Carved geometry) 240 and supplied source graphics 230, automatically generates graphics and code specific for the selected platform 430. The interactive interface designed by the author is previewed as native code for the platform of intended interactive interface publication. For example, if the author chooses to publish the final interactive interface as a regular web page, Carving Station would automatically generate graphics for the individual interactive elements. Because the composition retains both positional and size information of the element graphics, Carving Station can then automatically generate an HTML file that references graphics containing the correct layout of the respective interactive elements. There is no need for the author to input or adjust the positional information manually. In one embodiment, an instance of the appropriate viewer for the platform selected is invoked within the Carving Station Preview window. In the example of an HTML webpage, the Internet Explorer® Web Browser Control is used. Carving Station can easily output interactive interfaces conforming to other platforms, such as Microsoft® .NET, PowerPoint® and Adobe® Flash®, without any alteration to the design process. When the author is satisfied with the interactive interface designed, the author can instruct Carving Station to "publish" the interactive interface 450. All corresponding graphics and codes are automatically generated by Carving Station and stored in the author defined output destination, such as a repository directory 720.

FIGS. 8A and 8B illustrate a screen shot of Carving Station 710 in the Preview mode 830. In the FIGS. 8A and 8B illustration, the interactive interface created and shown in FIG. 7 is displayed in the preview area 870. Two views of the Preview mode 830 (FIGS. 8A and 8B, respectively) are shown to demonstrate the interactivity defined by the author. In FIG. 8A, the mouse pointer 850 is placed on top of the first element, and the first button is displayed in the rollover state 840, while the rest of the elements remain displayed in the normal state 860. In FIG. 8B, the mouse pointer 850 is placed on top of the second element, and the second element is displayed in the rollover state 840, while the first, third, fourth and fifth elements are displayed in the normal state 860.

In a preferred embodiment, such display is generated by the automated operation of file creation after author completion of the two step creation process (i.e., after author creation of a full screen graphics for each desired state, and after geometric identification of each interactive element). After author input of a full screen graphics for each state, and author definition (identification) of positional information for each interactive element, Carving Station automatically generates an image file for each state of each element. Accordingly, Carving Station automatically generates the multiple images, and records the respective positional information, once painstakingly created by the user through the "cutting and placing" process. For instance, in the FIGS. 5A and 5B example, for an interface having five two-state buttons, Carving Station will automatically generate the ten individual graphics (i.e., one graphic for each of five buttons for the normal state 510 and one graphic for each of five buttons for the rollover state 520) after author input of one full screen graphics for the normal state and one full screen graphics for the rollover state, and after author identification of the five interactive elements. So, as shown in FIG. 8B, when the mouse pointer 850 is placed on top of the second element, the present invention retrieves the automatically generated file for the second element in the rollover state 840 and accordingly displays that image in the second element location of the preview area 870.

In further embodiments of the present invention, such displays occur alternatively. For instance, rather than automatically generate and later retrieve the specific image for the rollover state 840 of the second element in the FIG. 8B example, the present invention could reference the full screen graphics created and stored for the rollover state, and present the respective portion thereof, as previously defined by the author for the second element, when the mouse pointer is placed on top of the second element, as in the FIG. 8B example. An additional alternative embodiment would have the full screen graphics for the normal state displayed in the preview area 870 (for instance, a look similar to that in FIG. 5B) and when the mouse pointer 850 is placed on top of the second element, as in the FIG. 8B example, the present invention essentially cuts out the second element, as previously positionally defined by the author, to reveal the full screen graphics for the rollover state, existing as an underlying layer. Since only the positional location of the second element has been removed, the only portion of the full screen graphics for the rollover state visible to the user is the second element portion.

In conclusion, Carving Station greatly reduces the number of individual data points and graphic files that an author must supply and manage, eliminating the need for the author to manually define and reassemble each element layer to achieve the final interactive interface. Alteration and addition of elements using Carving Station does not require that the author repeat the "cutting and placing" steps, or repeat the defining and reassembly of each element layer in the interface.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention.

What is claimed:

1. A method implemented at least in part by a machine for defining and generating graphics for one or more interactive elements to be used in an interactive user interface, the method comprising:

inputting into a graphical user interface a first full screen graphic that includes a first image illustrating a graphic in a first state;

inputting into the graphical user interface a second full screen graphic that includes a second image illustrating the graphic in a second state;

selecting a first area of the first image and a second area of the second image, and defining the first area as a first interactive element and the second area as a second interactive element;

storing geometric properties and positional information for the first area and the second area; and automatically generating computer readable code and graphics for the first interactive element and the second interactive element, wherein the graphics of the first interactive element are generated from the first image, and the graphics of the second interactive element are generated from the second image.

2. The method of claim 1, further comprising:

retrieving the stored geometric properties and positional information of the first area for the first interactive element; and retrieving the stored geometric properties and positional information of the second area for the second interactive element.

3. The method of claim 1, wherein the graphics for the first state of the first interactive element corresponds to a portion of the first full screen graphic delimited by the geometric properties and positional information defined and stored for the first interactive element, and wherein the graphics for the second state of the second interactive element corresponds to a portion of the second full screen graphic delimited by the geometric properties and positional information defined and stored for the second interactive element.

4. The method of claim 1, wherein the computer readable code generates graphics for the first state of the first interactive element in response to user input for the first state and the first interactive element, and the computer readable code generates graphics for the second state of the second interactive element in response to user input for the second state and the second interactive element.

5. The method of claim 1, wherein the interactive user interface is displayed in a web browser.

6. The method of claim 1, further comprising implementing the interactive user interface on a multi-touch interface on a handheld device.

7. The method of claim 1, wherein at least one of the first state and the second state comprises at least one of a normal state, a mouse over state, a pressed state, and a disabled state.

8. A system for defining and generating graphics for one or more interactive elements to be used in an interactive user interface, the system comprising:
- a processor system;
- memory coupled to the processor system, the memory comprising executable instructions that, when executed by the processor system, cause the processor system to effectuate operations comprising:
  - inputting into a graphical user interface a first full screen graphic that includes a first image illustrating a graphic in a first state;
  - inputting into the graphical user interface a second full screen graphic that includes a second image illustrating the graphic in a second state;
  - selecting a first area of the first image and a second area of the second image, and defining the first area as a first interactive element and the second area as a second interactive element;
  - storing geometric properties and positional information for the first area and the second area; and
  - automatically generating computer readable code and graphics for the first interactive element and the second interactive element, wherein the graphics of the first interactive element are generated from the first image, and the graphics of the second interactive element are generated from the second image.

9. The system of claim 8, the operations further comprising:
- retrieving the stored geometric properties and positional information of the first area for the first interactive element; and
- retrieving the stored geometric properties and positional information of the second area for the second interactive element.

10. The system of claim 8, wherein the graphics for the first state of the first interactive element corresponds to a portion of the first full screen graphic delimited by the geometric properties and positional information defined and stored for the first interactive element, and
- wherein the graphics for the second state of the second interactive element corresponds to a portion of the second full screen graphic delimited by the geometric properties and positional information defined and stored for the second interactive element.

11. The system of claim 8, wherein the computer readable code generates graphics for the first state of the first interactive element in response to user input for the first state and the first interactive element, and the computer readable code generates graphics for the second state of the second interactive element in response to user input for the second state and the second interactive element.

12. The system of claim 8, wherein the interactive user interface is displayed in a web browser.

13. The system of claim 8, the operations further comprising implementing the interactive user interface on a multi-touch interface on a handheld device.

14. The system of claim 8, wherein at least one of the first state and the second state comprises at least one of a normal state, a mouse over state, a pressed state, and a disabled state.

15. A non-transitory computer-readable storage medium comprising executable instructions for defining and generating graphics for one or more interactive elements to be used in an interactive user interface, wherein the executable instructions, when executed by a processor system, cause the processor system to effectuate operations comprising:
- inputting into a graphical user interface a first full screen graphic that includes a first image illustrating a graphic in a first state;
- inputting into the graphical user interface a second full screen graphic that includes a second image illustrating the graphic in a second state;
- selecting a first area of the first image and a second area of the second image, and defining the first area as a first interactive element and the second area as a second interactive element;
- storing geometric properties and positional information for the first area and the second area; and
- automatically generating computer readable code and graphics for the first interactive element and the second interactive element, wherein the graphics of the first interactive element are generated from the first image, and the graphics of the second interactive element are generated from the second image.

16. The non-transitory computer-readable storage medium of claim 15, the operations further comprising:
- retrieving the stored geometric properties and positional information of the first area for the first interactive element; and
- retrieving the stored geometric properties and positional information of the second area for the second interactive element.

17. The non-transitory computer-readable storage medium of claim 15, wherein the graphics for the first state of the first interactive element corresponds to a portion of the first full screen graphic delimited by the geometric properties and positional information defined and stored for the first interactive element, and
- wherein the graphics for the second state of the second interactive element corresponds to a portion of the second full screen graphic delimited by the geometric properties and positional information defined and stored for the second interactive element.

18. The non-transitory computer-readable storage medium of claim 15, wherein the computer readable code generates graphics for the first state of the first interactive element in response to user input for the first state and the first interactive element, and the computer readable code generates graphics for the second state of the second interactive element in response to user input for the second state and the second interactive element.

19. The non-transitory computer-readable storage medium of claim 15, wherein the interactive user interface is displayed in a web browser, the operations further comprising implementing the interactive user interface on a multi-touch interface on a handheld device.

20. The non-transitory computer-readable storage medium of claim 15, wherein at least one of the first state and the second state comprises at least one of a normal state, a mouse over state, a pressed state, and a disabled state.

* * * * *